United States Patent [19]

Stein

[11] 4,290,693
[45] * Sep. 22, 1981

[54] ARRANGEMENT FOR MEASURING THE RANGE OR SPEED OF AN OBJECT

[75] Inventor: Karl-Ulrich Stein, Munich, Fed. Rep. of Germany

[73] Assignee: Siemens Aktiengesellschaft, Berlin & Munich, Fed. Rep. of Germany

[ * ] Notice: The portion of the term of this patent subsequent to Feb. 3, 1998, has been disclaimed.

[21] Appl. No.: 20,813

[22] Filed: Mar. 15, 1979

[30] Foreign Application Priority Data

Mar. 31, 1978 [DE] Fed. Rep. of Germany ....... 2813913

[51] Int. Cl.³ .......................... G01C 3/08; G01P 3/68; G01J 1/36; G03B 13/18
[52] U.S. Cl. ............................. 356/1; 356/4; 356/28; 250/204; 354/25; 354/162
[58] Field of Search .................. 354/25, 31, 602, 163, 354/198, 162; 352/140; 250/201, 204; 356/5, 1, 4, 28; 358/105, 213

[56] References Cited

U.S. PATENT DOCUMENTS

| | | | |
|---|---|---|---|
| 3,617,128 | 11/1971 | Harvey | 354/163 X |
| 3,844,658 | 10/1974 | Gela et al. | 354/163 X |
| 3,945,023 | 3/1976 | Stauffer | 354/25 |
| 4,004,852 | 1/1977 | Pentecost | 250/201 X |
| 4,059,756 | 11/1977 | Wilwerding | 354/25 X |
| 4,171,155 | 10/1979 | Jyojiki et al. | 354/25 |
| 4,173,402 | 11/1979 | Horike et al. | 354/25 |

FOREIGN PATENT DOCUMENTS 2722804 8/1977 Fed. Rep. of Germany ........ 354/25

Primary Examiner—L. T. Hix
Assistant Examiner—William B. Perkey
Attorney, Agent, or Firm—Hill, Van Santen, Steadman, Chiara & Simpson

[57] ABSTRACT

The invention relates to an arrangement for measuring the range or speed of an object, in which two optical devices are offset from one another transversely to the direction of the object to produce auxiliary images of such an object, which are photoelectrically analyzed relative to one another. The minimum difference signal indicates the congruency of the two auxiliary images and supplies a criterion for the range of the object. In accordance with the invention, the auxiliary images are analyzed by CTD image sensors, whose read-out signals are supplied to a differential amplifier and are then rectified and integrated. The read-out signals from one sensor are changed, as to their phase state, with respect to the read-out signals from the other sensor, by means of a pivotal movement of the relevant optical device, by means of a delay element which can be adjusted in a stepped manner. The range criterion is obtained from the phase state assigned to the minimum difference signal. The invention can be used in range measuring devices, speed measuring devices and photographic cameras.

24 Claims, 7 Drawing Figures

ARRANGEMENT FOR MEASURING THE RANGE OR SPEED OF AN OBJECT

BACKGROUND OF THE INVENTION

The invention relates to an arrangement for measuring the range or speed of an object, wherein two optical devices are provided, which are offset relative to one another approximately transversely to the direction of the object, and which supply two images of the object, which images are in the form of electrical signals, and by a comparison of the signals, forms a measured value which represents the range.

An arrangement of the type wherein two images are derived from two subsidiary pupillary openings which represents partial areas of the entrance pupil of an objective lens system, and wherein the light entering the respective openings are supplied to separate photo detectors, is described in German AS No. 2,156,617, with particular reference to FIG. 2 thereof.

The disadvantage of this known arrangement resides in the fact that each of the photo detectors supplies an electrical signal which is derived from an integration of the brightness values of the overall image content. The congruency of two images obtained by a comparison of two such signals cannot be established with a high degree of accuracy. Moreover, the two images are derived over a grid which is arranged in an image plane of the object and is mobile within the latter, which increases the mechanical outlay. Further, the distance of the object is not established until after a focusing procedure of the objective lens system from the mechanical setting of the latter.

The present invention therefore has among its objects the improvement upon known arrangement, of the general type referred, to with respect to the measuring accuracy which can be achieved, at the same time providing the simplest possible design arrangement.

This is achieved, in accordance with the invention, by an arrangement in which two optical devices are provided which are offset from one another transversely to the direction of the object and which supply two auxiliary images of the object, and wherein a device is provided with analyses of the images, in the form of electrical signals, and, by a comparing of signals, forms a measured value which represents the range. One of the two optical devices includes a rotatably mounted mirror or reflector which is adapted to be rotated by a setting device in a sequence of settings, with the analyzing device containing two CTD image sensors individually assigned to the images and having linearly aligned image points arranged, in parallel relation, in the displacement direction of the image derived from the rotatably mounted reflector. The read-out signals obtained are supplied to an evaluating circuit which, on the occurrence of a sequence of read-out signals from the two image sensors, assigned to the setting sequence, forms from the difference therebetween a sequence of read-out signals integrated over the image points, and provides an output signal, dependent upon the setting of the reflector, on the occurrence of the integrated read-out signal having the smallest amplitude, which is representative of the range of the object.

In accordance with another feature of the invention, two optical devices are provided which are offset relative to one another at right angles to the optical axis, and which supply two auxiliary images, both of which are normally stationary, and two CTD image sensors are provided which are associated with the respective optical devices, the auxiliary images being generally displaced relative to one another, with their image points being linearly aligned and arranged, in parallel relation, in the direction of mutual displacement of the auxiliary images. The output of one of such image sensors is connected directly, or over a constant delay element, to an evaluating circuit and the output of the other sensor is connected to the evaluating circuit over a delay element which can be adjusted in a stepped manner in a predetermined setting sequence. The read-out signals obtained are suitably processed to provide an output signal which is characteristic of the delay set upon occurrence of the integrated read-out signal having the smallest amplitude, which is representative of the range of the object.

In accordance with another feature of the invention two optical devices are provided, which are offset relative to one another at right angles to the optical axis, and supply two auxiliary images, and two CTD image sensors are provided which are associated with the respective optical devices, the auxiliary images being generally displaced relative to one another, with their image points being linearly aligned and arranged, in parallel relation, in the direction of mutual displacement of the auxiliary images. The output of one of such image sensors is connected to a delay line having a plurality mutually offset outputs, and a series of differential amplifiers are provided whose first inputs are connected to respective outputs of the delay line, and whose second inputs are connected to the other image sensor either directly or over a constant delay element, with the outputs of the amplifiers being connected over respective rectifiers and respective following integrators to the inputs of a second evaluating circuit which determines the integration having the smallest output signal and produces signal which is characteristic of such integration and is representative of the range of the object.

The present invention has the particular advantage that the congruency of the two images is established by means of the correspondence or conformity of two electrical signals which are respectively obtained merely by integrating the brightness values prevailing in one line of the relevant image. This substantially increases the accuracy in the establishment of congruency, as compared with known arrangements. In particular, an erroneous measurement which could be caused by a random agreement of the signals, integrated from the entire image contents, without congruency actually existing between the two images, is eliminated. A further advantage resides in the fact that the CTD image sensors can be monolithically integrated on a semiconductor substrate with the individual components of the analyzing device forming a semiconductor module which can be easily accommodated in various devices which employ measurement of this type, without noticeably increasing the space requirement.

BRIEF DESCRIPTION OF THE DRAWINGS

In the drawings which illustrate preferred exemplary embodiments of the invention.

DETAILED DESCRIPTION OF THE INVENTION

Figure 1:
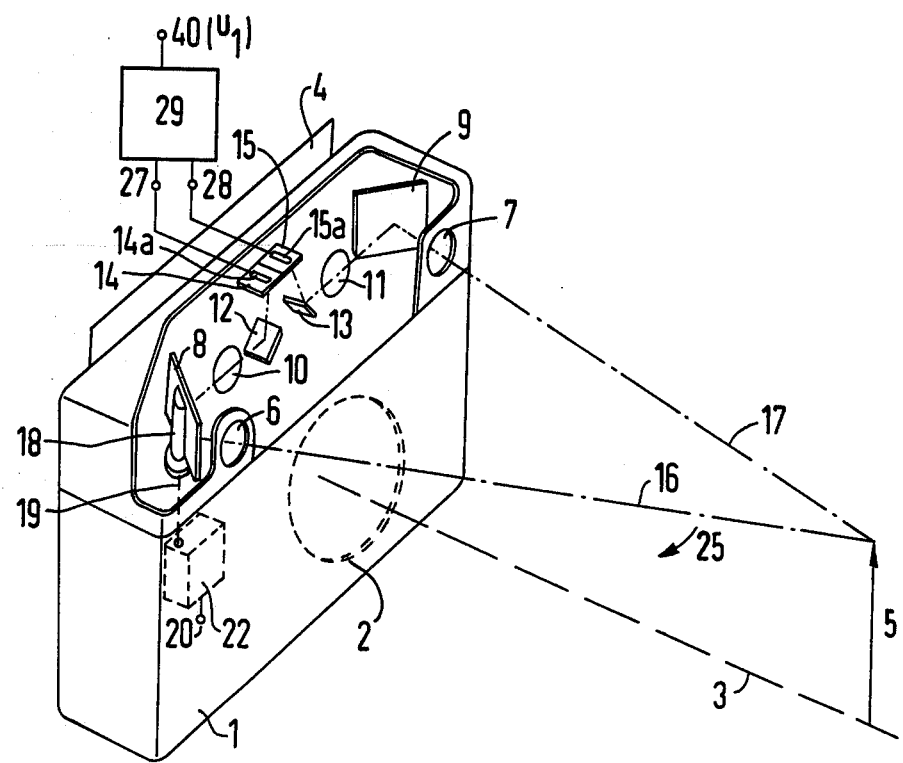
FIG. 1 schematically illustrates the construction of a first exemplary embodiment of the invention.

Referring to the drawings, FIG. 1 represents an arrangement, in accordance with the invention, embodied in a photographic camera. The latter contains an objective lens system 2 which can be retracted and extended in a female mounting which is fixedly carried by the camera housing, whereby the lens system can be adjusted with respect to its distance from an image plane 4, measured in the direction of the optical axis 3. The image plane 4, which actually lies within the camera housing and is determined by the plane in which the light-sensitive material, such as a photographic film, is disposed, for the sake of clarity has been schematically illustrated in FIG. 1 externally of the camera housing. The distance of the objective lens system 2 from the image plane 4 is to be set to a value which is such that an object 5 is focused with maximum definition in the image plane 4. The objective distance is set automatically by means of two optical devices, each of which comprises auxiliary pupillary openings 6 and 7, mirrors 8 and 9, collective lenses 10 and 11, deflection mirrors 12 and 13, and two projection surfaces 14 and 15, with resultant auxiliary images of the object 5 being projected on such projection surfaces. Respective light beams emanating from the tip of the object 5 are designated by reference numerals 16 and 17.

The mirror 8 is rigidly connected to a rotatably mounted vertical pin 18 which is connected to a setting device 22 by means of a drive element 19, schematically indicated by a broken line. If the light beam 16, falling on a projection surface 14 is rotated, as a result of rotation of the mirror 8, in accordance with arrow 25, the intersection point of the beam 16 and 17 moves increasingly further away from the camera 1 parallel to the optical axis 3.

For a setting sequence of different angular positions of the mirror 8 when the beams 16 and 17 initially have an intersection point in the vicinity of the camera, whereby such intersection point will be moved increasingly further away, a constant auxiliary image of the object 5 is formed on the projection surface 15 whereas the auxiliary image of the object on the projection surface 14 is displaced in a direction at right angles to the image plane 4 in accordance with the rotary movement of the mirror 8. In the event that the beams 16 and 17 are aligned directly on the object 5, as in FIG. 1, the auxiliary images on the projection surfaces 14 and 15 are not displaced relative to one another. The mutual shift of the auxiliary images or the absence of such a shift is analyzed by means of CTD image sensors 14a and 15a whose outputs are designated by reference numerals 27 and 28, with the output signals of the respective sensors being conducted to an evaluating circuit 29, operative to form an adjusting signal $u_1$ which is representative of the range of the object 5 from the camera 1.

The image sensors 14a and 15a comprise charge transfer devices having a number of image points which are linearly aligned. The longitudinal axes of the two image sensors 14 and 15 are parallel to the displacement direction of the auxiliary image derived over the rotatably mounted mirror 8 and are also aligned to mutually corresponding lines of the auxiliary images which contain a specific point on the object, for example the arrow 5. The design of the image sensors will subsequently describe in further detail with reference to FIGS. 3 and 4.

Figure 2:
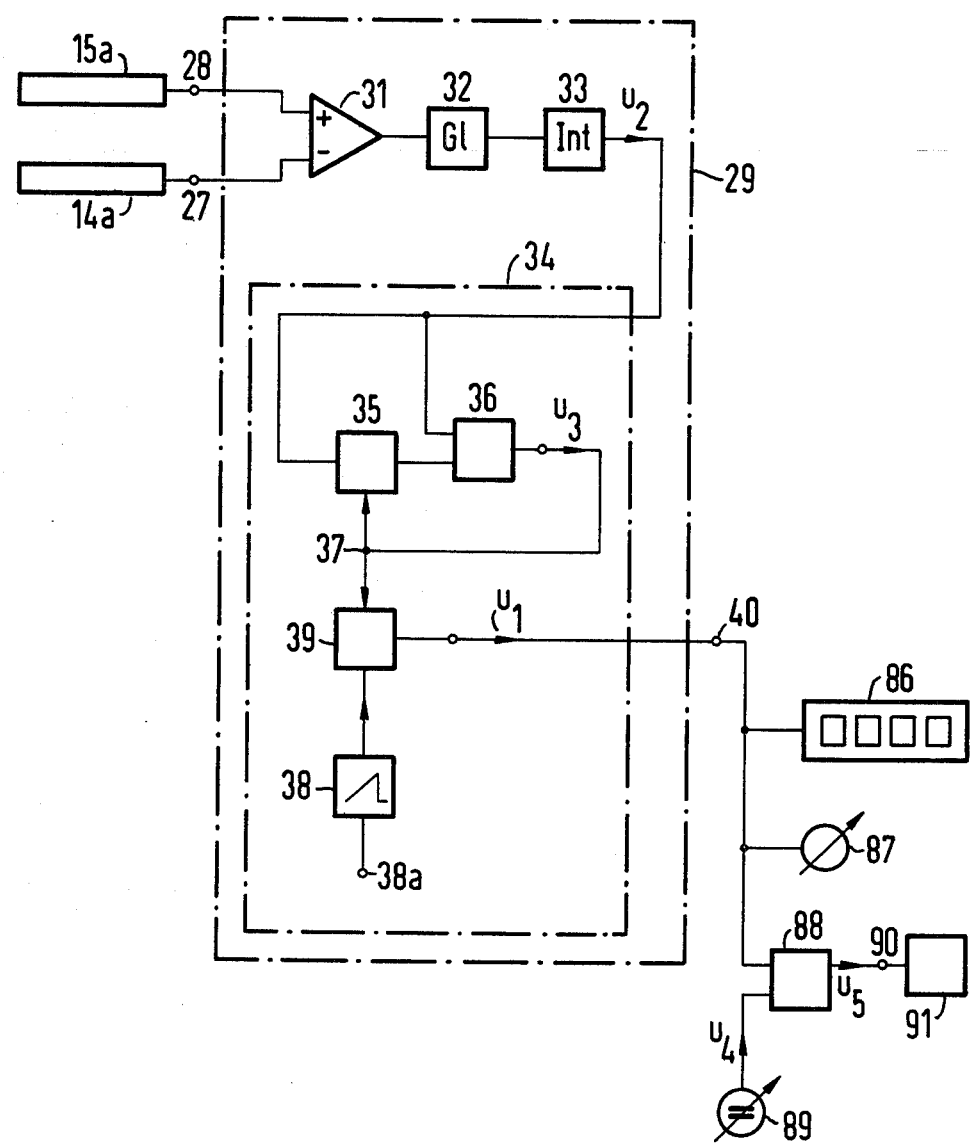
FIG. 2 illustrates the schematic circuitry of the exemplary embodiment of FIG. 1.

As will be apparent from FIG. 2, the image sensors 14a and 15a are provided with respective output terminals 27 and 28 over which the electrical signals formed in the individual image points of the sensors, in dependence upon the local illumination thereof, are sequentially read-out. For each setting of the mirror 8 read-out signals will appear at the outputs 27 and 28, whose time slope corresponds to the illumination of the consecutively read-out image points. The difference signal of such read-out signals is formed in a differential amplifier 31, rectified in a following rectifier 32, and integrated in a subsequent integrator 33. As a result, there will appear at the output of the integrator 33, an integrated read-out signal $u_2$ which corresponds to a mean value, formed from all the image points of the image sensors, of the difference signals of the two sensors derived from corresponding image points.

In dependence upon a sequence of subsequently effected distances of the objective 2 from the image plane 4, a sequence of integrated read-out signals $u_2$ are formed in the manner heretofore described and are supplied to a selection stage 34, in which they are conducted to the signal input of a first scanning stage 35 and to the first input of a comparator 36. A signal at the control input 37 of the scanning stage 35 causes the scanning of the initially occurring signal $u_2$, the storage thereof in such stage, and the switching through of such signal to the output thereof. Consequently, such signal is also present at the second input of the comparator 36. If a second signal $u_2$ now occurs which is smaller than the first, a pulse-like output signal $u_3$ will appear at the output of the comparator 36 which is supplied to the stage 35 over the control input 37 thereof, causing such stage to scan the smaller signal $u_2$ and supply it to the second input of the comparator 36. Each of the signals $u_2$ which is smaller than any of the signals $u_2$ which preceded it in period of the same setting sequence is able, as a result of the control action of the comparator 36 upon the stage 35, to displace the signal $u_2$ previously stored therein and thus serve as a new reference signal for following comparison procedures which take place in the comparator 36. At the end of a setting sequence, the stage 35 stores that integrated read-out signal $u_2$ which possesses the smallest amplitude.

If now, the synchronism with the beginning of the setting sequence, a generator 38 is triggered over the input 38a thereof, and subsequently produces a rising or falling voltage curve, the pulse-like signal $u_3$ which is emitted on the occurrence of the smallest signal $u_2$ initiates the scanning and storage of the amplitude value $u_1$, existing at this time, of the voltage of the generator 38, with the control input of the stage 39 being in common with the control input 37 of the first scanning stage 35. The signal $u_1$ corresponding to the time difference between the occurrence of the integrated read-out signal $u_2$ having the smallest amplitude and the beginning of the setting sequence, can be derived from the output 40 of the selection stage, which simultaneously represents the output of the evaluating circuit 29. This signal represents a criterion of the range of the object 5.

The signal $u_1$ is supplied to a digital display device 86 or an analogue display device 87. A further possibility of analyzing the range comprises comparing the signal $u_1$ in a comparator 88 with a reference signal $u_4$ supplied by a voltage source 89 which is adjustable, and in utilizing a signal $u_5$ which occurs in the event of voltage identity at the output 90 of the comparator, to indicate the fact that the object 5 has reached a given range from the camera 1. By carrying out a double comparison between a periodically determined signal $u_1$, which is obtained by periodic setting sequences of the reflector 8, and two reference signals $u_4$ for a different values, when the object 5 is moved, a speed measurement can be derived from the interval of time between the two occurring signals $u_5$, which may be measured by a time measuring device 91. In this case the time interval expediently is measured in digital form.

The components 38 and 39 of the selection stage 34, which can be considered a time measuring device can also be replaced by a time measuring device of different construction. The system would then have the function of measuring the interval of time between the trigger pulse which appears at the terminal point 38a, and which coincides in time with the beginning of the setting sequence, and the occurrence of the signal $u_3$, thereby producing the measurement result in the form of a voltage $u_1$.

Figure 3:
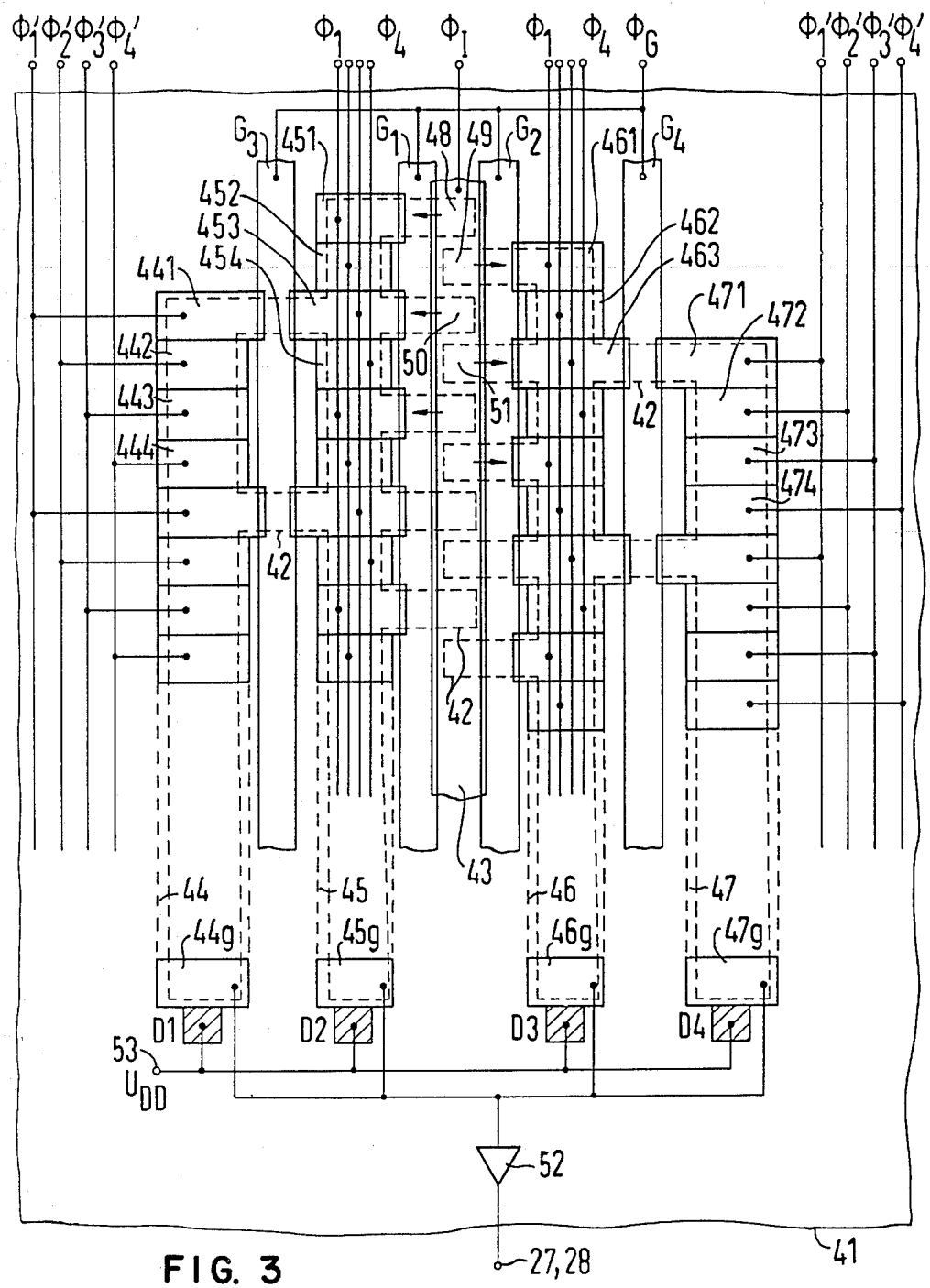
FIG. 3 schematically illustrates a CTD image sensor which can be employed in all of the exemplary embodiments illustrated.

Referring to FIG. 3 which is a plan view of a preferred embodiment of a CTD image sensor, designated by the reference numeral 41, which is integrated on a semiconductor substrate comprising, for example, N-conducting silicon. The substrate surface is covered by an electrically insulating layer which, for example, may comprise $SiO_2$ and which has considerably less thickness within the broken lines 42 than exteriorly thereof. The thinner areas of this layer may also be referred to as gate-oxide zones, whereas the thicker zones may be referred to as field oxide zones. Above the insulating layer is disposed a central electrode 43 at one side of which are rows of electrodes 44 and 45 and at the opposite side of which are rows of electrodes 46 and 47. The electrodes are metallically conductive structures which comprise, in particular, portions of an electrically conductive coating applied to the entire surface which, for example, may comprise polycrystalline, highly doped silicon, or may be a metal layer, as for example aluminum. The electrode 43 and the rows of electrodes 44 to 47 may be produced in conventional manner, as for example, by utilization of a series of photolithographic steps employing masks which define the outlines of the individual structures.

Those points of the semiconductor substrate 41 lying beneath the thin oxide zones and covered by the electrode 43 represent individual image points 48, 49, 50, 51 etc. of the image sensor, and as such points are disposed in a line, an image sensor of this type is referred to as being linear. The electrodes 44 to 47 each comprise individual, closely adjacent electrodes 441, 442, 443, 444 . . . 451, 452, 453, 454 etc. The electrode 451 is disposed at the level of image point 48, electrodes 452 and 461 at the level of image point 49, electrode 441, 453 and 462 at the level of image point 50, electrodes 442, 454, 463 and 471 at the level of image point 51, etc. Between the rows 45, 46 of electrodes and the electrode 43 are disposed transfer-gate-electrodes $G_1$, $G_2$ which are so disposed that they slightly laterally overlap the firstmentioned electrodes but are electrically insulated therefrom by an intermediate insulating layer. Likewise, between the rows 44 and 45 of electrodes and between the rows 46 and 47 of electrodes are arranged further transfer-gate-electrodes $G_1$ and $G_4$, respectively. The electrode 43 is connected over a terminal to a pulse voltage $\phi_I$, while the transfer-gate-electrodes $G_1$ to $G_4$ are connected over a common terminal to a pulse voltage $\phi_G$.

Each fourth electrode 451, 454, etc. of the row 45 is connected over a common line to a pulse voltage $\phi_1$, while each fourth electrode 452, 455 is connected to a common line which carries a pulse voltage $\phi_2$. In like manner each fourth electrode 453 etc. is connected to a line carrying the pulse voltage $\phi_3$ and each fourth electrode 454 etc. is connected to a line carrying the pulse voltage $\phi_4$. Similarly, the individual electrodes of row 46 are connected to the pulse voltages $\phi_1$ to $\phi_4$, while the electrodes of rows 44 and 47 are connected to the pulse voltage $100_{1'}$ to $\phi_{4'}$.

The electrodes of each row 44 to 47 form part of a charge transfer device pulsed by the pulse voltage $\phi_1$ to $\phi_4$ and $\phi_{1'}$ to $\phi_{4'}$. The electrodes 44g to 47g, illustrated at the bottom end of each row of electrodes, represent so-called "floating gate" electrodes which are free of the pulse train voltages but are connected to a common input of an amplifier 52, with such electrodes being followed at the output-side by diffusion zones $D_1$ to $D_4$ which are connected over a common terminal 53 to a drain voltage $U_{DD}$.

Figure 4:
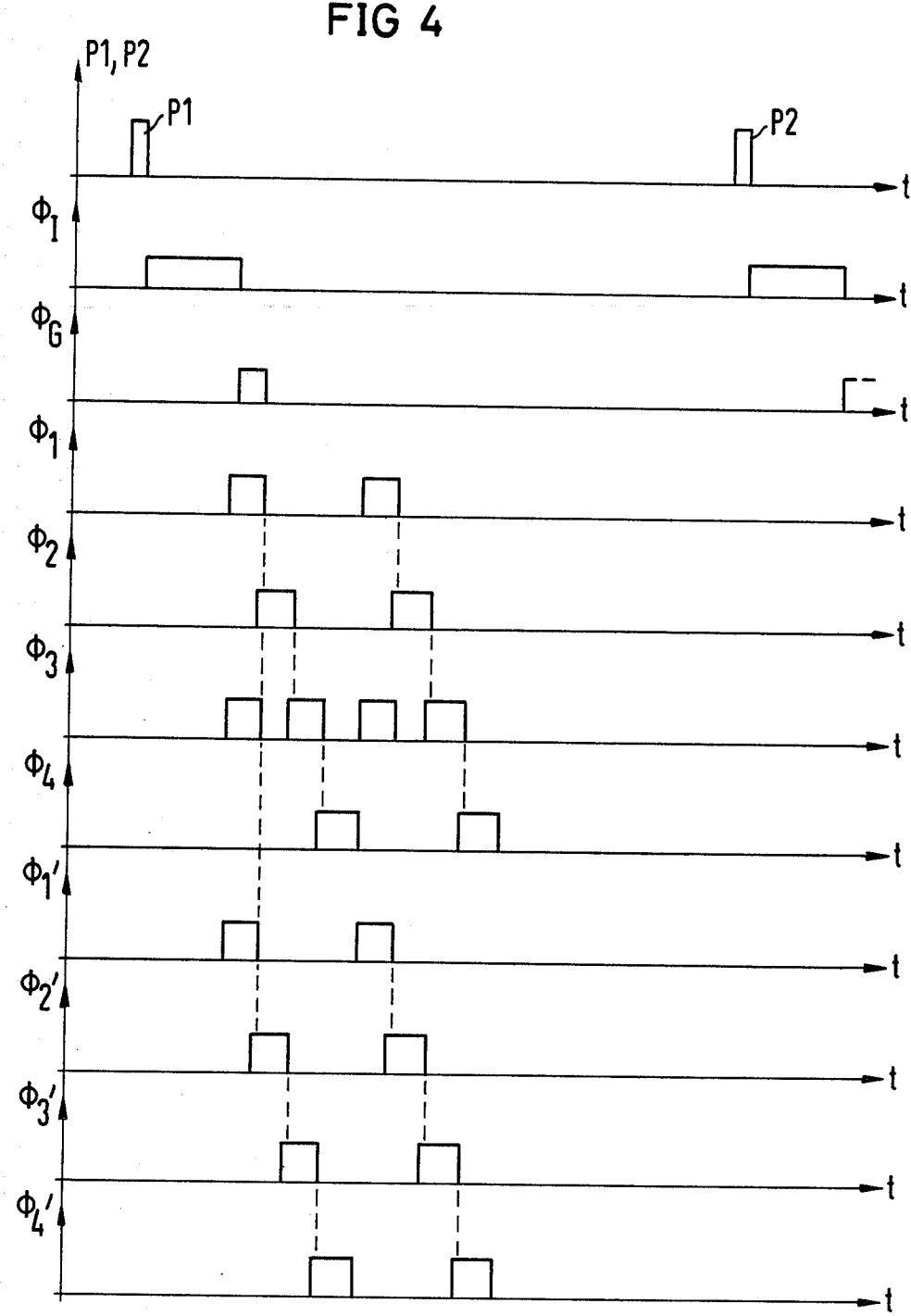
FIG. 4 is a time diagram which illustrates the operation of the exemplary embodiment shown in FIGS. 1 and 2, in combination with a CTD image sensor such as illustrated in FIG. 3.

In the operation of the system, following the occurrence of a pulse $P_1$ which is supplied to input 20 of the setting device 22, a first setting of the reflector 8, within a setting sequence, is effected, a pulse $\phi_I$ is connected which determines the so-called integration period of the image sensors 14a and 15a designed in accordance with FIG. 3. Within this integration time, under the influence of the optical illumination, electrical charges corresponding in value to the particular local illumination intensity accumulate at the image points 48 to 51. A transfer gate pulse $\phi_G$ ensures that these charges are displaced, at the end of the integration period, in the direction of the arrows out of the image points into the area of the charge transfer devices 44 to 47. In other words, the charge formed beneath the area 48 is displaced beneath the electrode 451, the charge formed beneath the area 49 is displaced beneath the electrode 461, the charge formed beneath the area 50 is displaced beneath the electrode 441, and the charge formed beneath the area 51 is displaced beneath the electrode 471. The shift pulse trains $\phi_1$ to $\phi_4$ and $\phi_{1'}$ to $\phi_{4'}$ occurring at times as illustrated in FIG. 4, ensure that the electrical charges, following passage through the charge transfer devices, are advanced in stepped fashion beneath the electrodes 44g to 47g and finally reach the diffusion zones $D_1$ to $D_4$. The potential shifts taking place across the electrodes 44g to 47g are transferred to the output 27 for the sensor 14a and to output 27 for the sensor 15a where they produce read-out signals, which comprises consecutively occurring pulse-like components corresponding to the illumination intensities in the consecutively read-out image points during the integration time.

A pulse $P_2$ supplied to the input 20 of the setting device 22 effects a setting to the next value x within the same setting sequence, following which a further pulse $\phi_I$ defines the integration period assigned to this setting. This integration period can also coincide with the displacement of the charges, formed in the preceding integration period, across the charge transfer devices 44 to 47.

An image sensor of the type above described is described in detail in German Pat. No. 2,553,658. One way in which such exemplary embodiment of a CTD image sensor can be simplified is to eliminate the charge transfer devices 44 and 47 and effect a read-out merely over the devices 45 and 46, thus reducing the number of read-out image points by half, namely to the points 48, 49 and to the points which are spaced from these points by a distance corresponding to a multiple of four image point intervals. An image sensor of this kind is described, for example, in the publication "IBM Technical Disclosure Bulletin", Vol. 16, No. 1, June 1973, pages 173 and 174. It might be mentioned that in lieu of the charge transfer devices 44 to 47 which are to be considered as SCCD devices facilitating charge transport directly beneath the substrate surface, or BCCD devices facilitating charge transport inside the substrate, it is possible within the scope of the present invention to utilize bucket chain circuits, known per se (BBD). Both systems of charge transfer devices are described, for example, in the book "Charge Transfer Devices", by Sequin and Tompsett, Academic Press, New York, 1975, pages 1 to 18.

It will also be appreciated that it is possible, instead of utilizing charge transfer devices operating with four-phase operation, to employ devices which operate, in known manner, in two-phase or three-phase operation. Further, the central electrode 43 of FIG. 3 can also be divided into a row of electrodes corresponding to the parts 44 to 47, in which case all the electrodes in this row are initially supplied with a common pulse $\phi_I$ which defines the integration time, whereupon the individual electrodes are supplied with the shift pulses $\phi_1$ to $\phi_4$ as illustrated in FIG. 4. However, it should be noted that only the image points lying beneath each fourth electrode are illuminated. In the lastmentioned example, the amplifier 52 would be connected to the lower part of the electrode 43, which then represents a floating-gate electrode, and the charge devices 44 to 47 are omitted. In this case a continuous gate oxide zone is disposed beneath the split electrode 43.

Assuming that each electrode in the respective rows of electrodes 44 to 47 has a length of 10 $\mu$m, and 100 elements or image points 48, 49, etc. are provided, the length of the image sensors 14a and 15a will be 1 mm. In this case, a read-out time of 0.1 ms corresponds to a repetition frequency of the shift pulse trains $\phi_1$ to $\phi_4$ of 1 MHz. Further, assuming that the integration time is on the order of 10 ms, the read-out time is negligible by comparison. Thus, a setting sequence of 50 individual steps, each of which must be assigned an integration time of 10 ms, has a time requirement of approximately 0.5 seconds. At the end of this period, the evaluating circuit 29 has determined the signal $U_1$.

Figure 5:
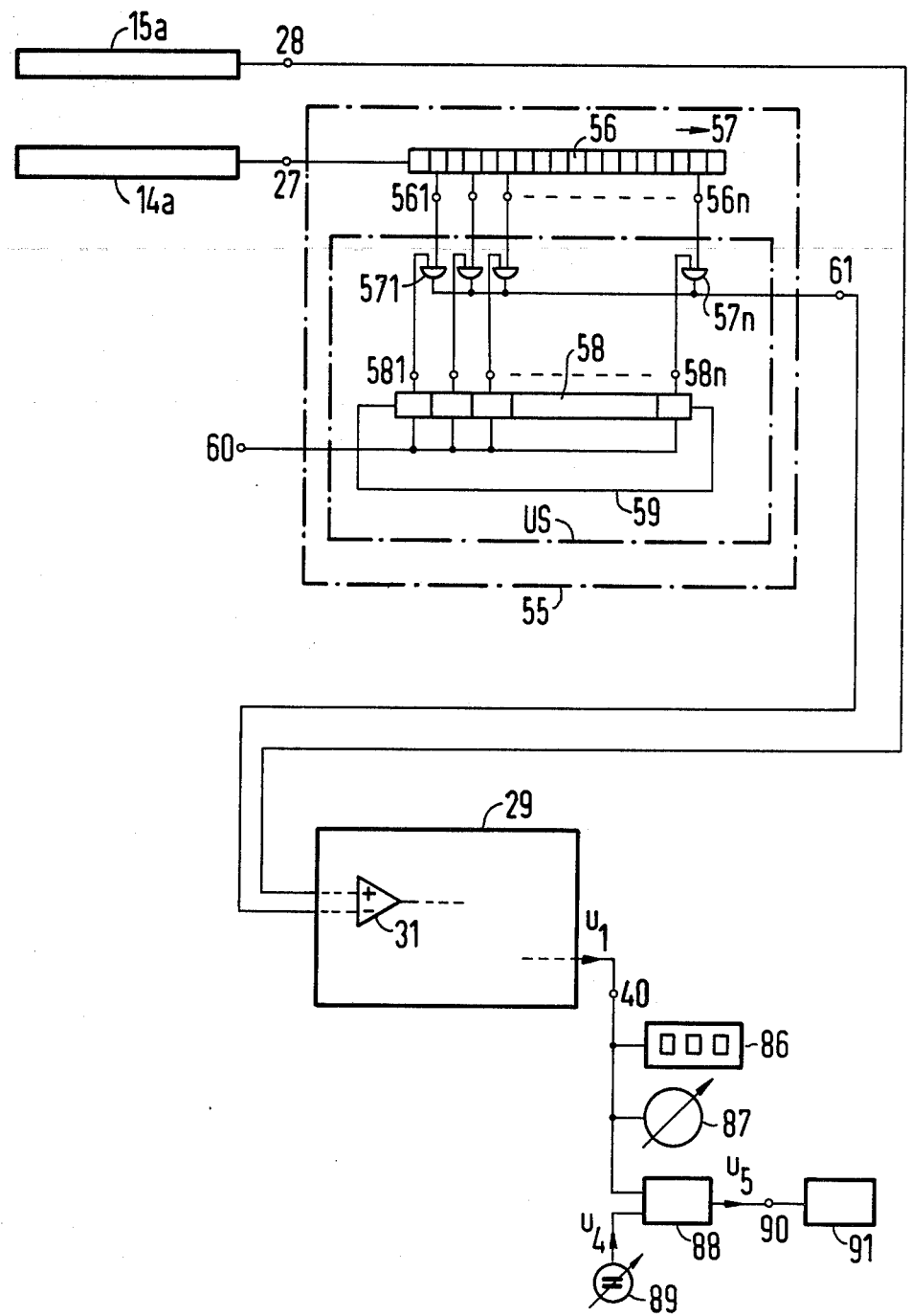
FIG. 5 is a schematic diagram illustrating the circuitry of a second exemplary embodiment.

FIG. 5 illustrates a second exemplary circuit embodiment of the invention, utilizable with the structure of FIG. 1, which differs from the first embodiment primarily in the utilization of a mirror 8 which is stationary and the components 19, 20 and 22 have been omitted. In this arrangement the rotatable mirror 8 is replaced by a delay element 55 which can be adjusted in a stepped manner and which operatively follows directly after the sensor output 27. The circuit of FIG. 5 otherwise corresponds to that of FIG. 2.

The delay element 55 comprises a shift register 56, to the input of which is supplied the pulse-like components of the read-out signal of the image sensor 14a appearing at the output 27 thereof in the serial sequence in which they occur. The analog signal values derived from the individual image points of the image sensor 14a are then displaced in the shift register 56 in the direction of arrow 57. Individual stages of the shift register 56, which are equidistant from one another, are connected over outputs 561 to 56n to the first input of a series of AND-gates 571 to 57n, the second inputs of each being connected to the output 581 to 58n of the stages of a shift register 58, the last stage of which is connected over a line 59 to the signal input of the first stage.

A logic signal, characterized by a high voltage value, is input into the shift register 58, which is displaced into the next stage whenever a timing pulse occurs at the input 60, and thus is supplied to the pulse train inputs of the stages over a common line. With the exception of the stage which stores such logic signal all other stages of the shift register 58 are supplied with logic signals characterized by a low voltage value. The output which is supplied with the high voltage logic signal, i.e. one of the outputs 581 to 58n, switches through one of the outputs 561 to 56n to the output 61 of the delay element over the corresponding AND-gate. Upon the occurrence of the next timing pulse at the input 60, it is replaced by the next output of 56 considered in the direction of arrow 57.

The read-out signals of the image sensor 14a which are entered in the shift register 56 are thus delayed in an adjustable manner, the degree of delay being dependent upon that stage of the shift register which is supplied with the individual high voltage logic signal. The read-out signal which has been so delayed in a stepped manner is thus supplied, together with the read-out signal derived from the image sensor 15a over the output 28, and possibly a following constant delay element, to the two inputs of a differential amplifier 31 which respresents the input stage of the evaluator circuit 29 previously described with respect to the circuit of FIG. 2.

Particularly advantageously, the shift register 56 comprises a charge transfer device such as that represented, for example, in FIG. 3 and designated by the reference numeral 44. The input stage of a charge transfer device of this type, which consists of an input zone which is doped oppositely to the semiconductor substrate and is referred to as a diode input, and the first two electrodes, i.e. 441 and 442 of FIG. 3, is designed in accordance with FIG. 3.12 on page 49 of the book "Charge Transfer Devices" by Sequin and Tompsett, Academic Press, Inc., New York 1975. The individual outputs 561 to 56n are formed by "floating gate" electrodes which simultaneously represent the gate electrodes of output field effect transistors. This type of output coupling is described in detail in association with FIG. 3.14(c) on page 53 of the aforementioned book by Sequin and Tompsett.

If it is assumed that the shift register 56 contains a series of electrodes 441 to 444, etc., in accordance with FIG. 3, which, in the manner described, are supplied with timing pulse voltages $\phi_{1'}$ to $\phi_{4'}$ four consecutive electrodes, i.e. 441 to 444, belong to one stage of the shift register 56. The floating gate electrode which represents a part of the output of such stage then lies beneath one of the four electrodes belonging to such a stage.

If it is assumed that the pulse $P_1$ (FIG. 4) is supplied to the input 60 of the circuit of FIG. 5, and switches the output 581 of the shift register 58 to a high voltage level, the signal from the image sensor 14a which is formed on the expiration of an integration time determined by a pulse $\phi_I$, and is read-out over the output 27 at the output 561 during the stepped advancement across the shift register 56, and thus with the lowest possible degree of delay. At the end of the read-out operation, the input 60 is supplied with the pulse $P_2$, which switches over the image sensor 14a, formed in a following integration operation, and is read-out over the output 27 to the next output which follows 561, so that it is read out with the next greater degree of delay. A sequence of timing pulses $P_1$, $P_2$, etc. at the input 60, together with a synchronous sequence of pulses $\phi_I$ supplied to the middle electrode 43 of the image sensor 14a, at the circuit points 28 and 61, lead to the acquisition of the same sequence of read-out signals obtained in the circuit shown in FIG. 2 at the circuit points 27 and 28. The setting sequence in accordance with which the delay element 55 in FIG. 5 is set to different delay values, thus replaces the setting sequence in which the mirror 8 must be rotated in stepped manner about the pin 18 in an arrangement as shown in FIGS. 1 and 2.

Figure 6:
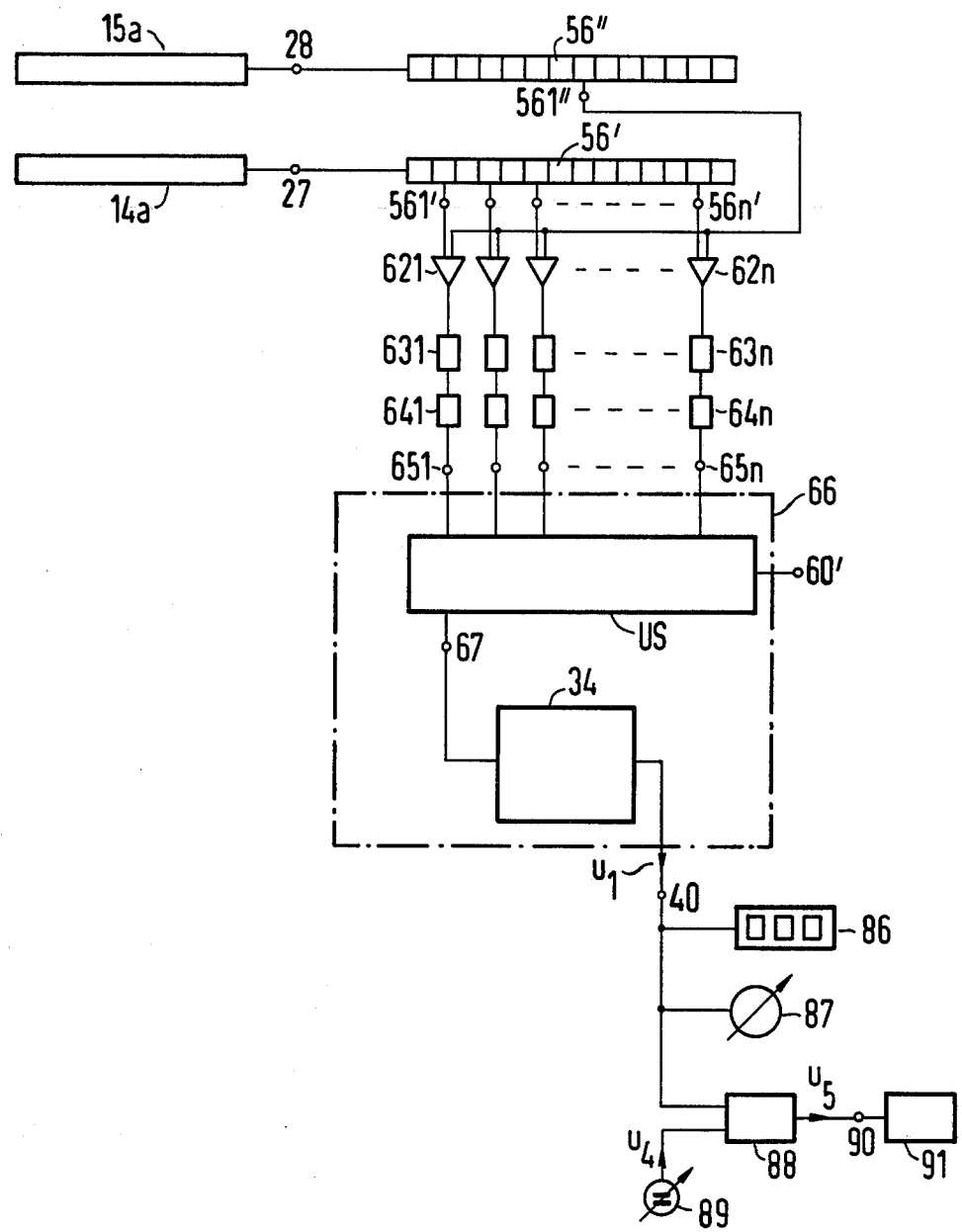
FIG. 6 is a schematic view illustrating the circuitry of a third exemplary embodiment.

FIG. 6 illustrates a third exemplary embodiment of the invention which is also based on a mechanical arrangement as illustrated in FIG. 1 but which likewise employs a stationary mirror 8 with the accompanying omission of the coupling parts 19, 20 and 22. In this arrangement the output 27 of the image sensor 14a is followed by a delay line 56' whose input is supplied in serial manner with the consecutively read-out pulse components of the image sensor signal. Preferably the delay line comprises a charge transfer device as previously described in connection with the device 56 of FIG. 5.

The outputs 561' to 56n', provided in accordance with FIG. 5, are in this case connected to the first inputs of a series of differential amplifiers 621 to 62n, while the output 28 of the image sensor 15a is connected to the input of a delay line 56'' which advantageously may employ a construction similar to the delay line 56', and in particular likewise comprise a charge transfer device such as previously described in connection with the component 56 of FIG. 5. In contrast to the delay line 56', the delay line 56'' possesses only one output 561'' which is connected to the second inputs of all the differential amplifiers 621 to 62n. The outputs of the differential amplifiers 621 to 62n are connected over individual cooperable rectifiers 631 to 63n and serially following integrators 641 to 64n to circuit points 651 to 65n which represent the inputs of a second evaluator circuit 66. The latter includes a switch-over device $U_S$ which corresponds to that illustrated in FIG. 5 and consecutively switches through the inputs 651 to 65n to a common output 67, connected to the input of a selection stage 34, which has previously been described in connection with FIG. 2. The output 40 of the selection stage 34 then supplies an adjusting signal $u_1$, which corresponds to the distance of the object 5 from the camera 1.

In the exemplary embodiment illustrated in FIG. 6, after an integration time determined by a pulse $\phi_I$, read-out signals which are delayed in stepped fashion relative to one another are derived virtually simultaneously from the image sensor 14a over all the outputs 561' to 56n' and are each processed in the differential amplifiers 621 to 62n with a read-out signal from the image sensor 15a which is obtained over the output 651'' of the delay element 56'' to form difference signals. Following rectification in the rectifiers 631 to 63n and integration over all the pulse components belonging to a read-out operation of the image sensors 14a and 15a, which is carried out in the integrators 641 to 64n, these difference signals are available substantially simultaneously at the circuit points 651 to 65n, as integrated read-out signals.

In contrast to the preceding exemplary embodiments, one signal integration period of the image sensors 14a and 15a is sufficient in the example of FIG. 6 for producing all of the read-out signals which, in accordance with FIGS. 2 and 5, are produced by a series of integration periods which are synchronous to the individual steps of the setting sequences of the objective systems and the various delay values. Consequently, the arrangement illustrated in FIG. 6 operates considerably more rapidly than the arrangements illustrated in FIGS. 2 or 5. The integrated read-out signals which are available at the inputs 651 to 65n can be very rapidly switched in turn to the output 67 by means of the switch-over device $U_S$, which is achieved by an appropriately high repetition frequency of the timing pulses supplied to the input 60'. The selection stage 34 processes the consecutively arriving integrated read-out signals in the manner above described to form the voltage $u_1$ which is supplied to the setting device 22 as the setting value.

Figure 7:
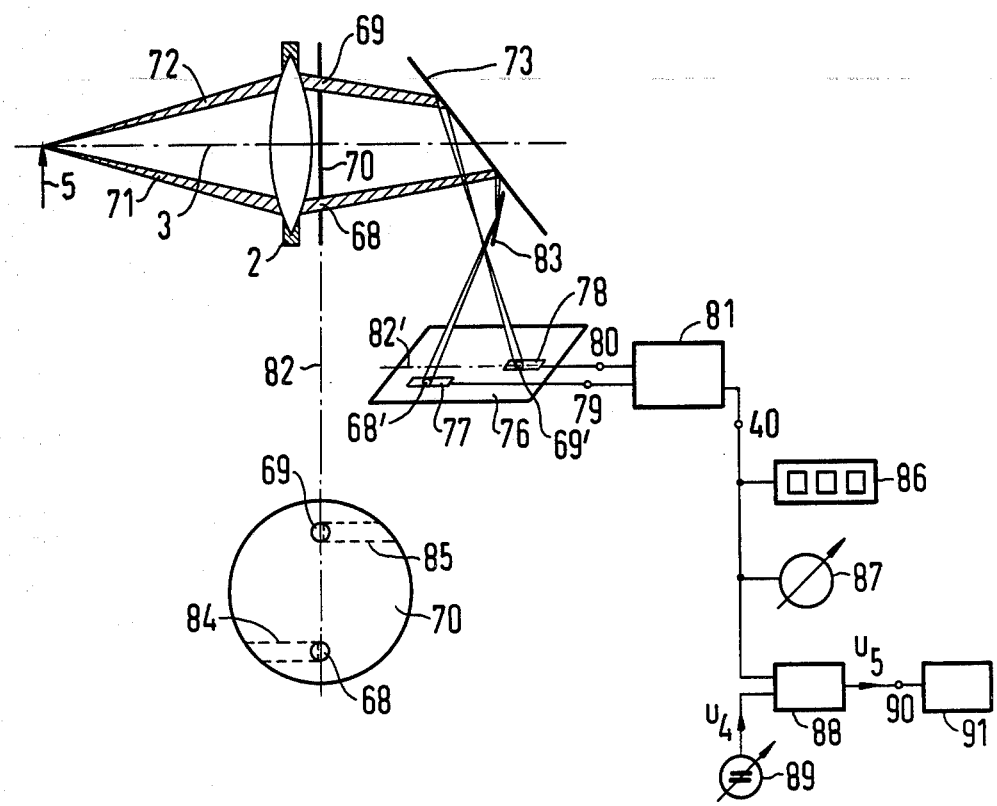
FIG. 7 is a schematic illustration of a further exemplary embodiment.

FIG. 7 schematically illustrates a further exemplary embodiment of the invention. In this arrangement two optical devices are vertically offset relative to the direction of the object 5, and comprise two subsidiary pupillar openings 68 and 69 of the objective lens system 2. In the embodiment illustrated, a diaphragm 70 is provided which has corresponding openings. The groups of light beams which emanate from the object 5 and traverse the subsidiary pupillar openings 68 and 69 are designated by reference numerals 71 and 72. Components 74 and 75 of such groups of light beams are partially reflected by means of a partially silvered mirror 73 and projected onto an auxiliary plane 76 which is displaced relative to an image plane, and in which two linear CTD image sensors 77 and 78 are arranged. The term image plane is to be understood as a plane under which the object 5 is focused with maximum definition. The outputs 79 and 80 of the image sensors are connected to an analyzing device 81 whose output 40 is connected to the input 30 of the setting device 22. The CTD image sensors are designed in the manner previously described.

In FIG. 7 the diaphragm 70 is shown as being rotated about a vertical axis 82 in the image plane and displaced downwards. When the subsidiary pupillar openings 68 and 69 are offset relative to one another in the direction of the axis 82, it is expedient to provide a reflector or a prism surface 83 in the path of one of the groups of beams 74 or 75 whereby the same is additionally deflected. This measure merely ensures that the images 68' and 69' which are derived over the subsidiary pupillar openings 68 and 69 are laterally offset in the auxiliary plane 76 relative to the projection axis 82' of the axis 82 so that the CTD image sensors 77 and 78 are correspondingly offset from one another. As a result, even in the case of a small interval of the subsidiary pupillars in the direction of the axis 82 they can readily be disposed one adjacent the other in the auxiliary plane 76. If, on the other hand, the subsidiary pupillar openings are formed by openings 84 and 85, indicated in broken lines, lying only on one side of the axis 82, it is possible to dispense with the reflector or prism surface 83.

The analyzing device 81 of FIG. 7 can be designed in accordance with FIGS. 2, 5 or 6. When designed in accordance with FIG. 2, the setting device 22 is actuated by trigger pulses supplied over the input 20 thereof to rotate the mirror 8 in stepped manner about the axis of pin 18, in order to obtain a sequence of read-out signals at the sensor outputs 79 and 80. If the analyzing device is designed in accordance with FIG. 5 or 6, a mechanical setting sequence of this type is omitted and is replaced by an electrical setting sequence of the delay element 55, which can be adjusted in stepped fashion in accordance with FIG. 5, or a switching sequence of the switch-over device $U_S$ of FIG. 6.

In accordance with a preferred further development of the principle of the invention, following each setting sequence or switching sequence, the setting device 22 or the delay element 55, or the switch-over device $U_S$ is retriggered, resulting in a new setting sequence or switching sequence which again leads to an adjusting signal $u_1$. In this way it is possible to constantly determine the range of an object 5, which is moving relative to the camera 1. This is subject to the condition that the relative speed between the components 2 and 5 should not exceed a limit value governed by the duration of a setting cycle.

In each of the described exemplary embodiments illustrated in FIGS. 2, 3, 5 and 6, the analyzing device can be constructed in integrated circuit technique and, in particular, can be assembled in the form of a monolithic semiconductor module, possibly including further semiconductor circuits involved in automatic exposure or electric diaphragm or shutter control of a photographic camera.

The arrangement in accordance with the invention has heretofore been described as a part of a photographic camera 1 (FIG. 1). Under these circumstances, the objective tool is generally manually adjusted with respect to its distance from the image plane 4 in dependence upon the result of the range measurement, so that the camera is focused on the object 5. However, the arrangement in accordance with the invention can also be advantageously utilized to measure the range of an object 5, or to determine its relative speed in relation to itself without the association with a photographic camera. In this case the image plane 4 of FIG. 1 is of no significance, nor is the objective tool which is merely required for the exemplary embodiment illustrated in FIG. 7. All the exemplary embodiments illustrated would then relate purely to range and speed measuring devices. These can be utilized, for example, for position monitoring of mobile objects 5 which are to be processed in an automatic production device, in which case the movement of the objects is stopped when a given position is reached. A speed measuring device of this type can also be utilized with advantage to monitor the road traffic, etc.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. In an arrangement for measuring the range of an object, wherein two optical devices are provided which are offset relative to one another transverse to the direction of the object and which supply two images of such object, with a device being provided which analyzes the images, in the form of electrical signals, and by a comparison of the signals, forms a measured value which indicates the range, combination of the analyzing device containing two CTD image sensors which are individually assigned to the auxiliary images, and whose aligned image points are arranged parallel to one another and in the direction of mutual displacement of the auxiliary images, an evaluating circuit, having one input to which the output of one CTD image sensor is operatively connected, and a second input to which the output of the other image sensor is connected over a delay element which can be adjusted, in a stepped manner, in a setting sequence, for forming from the difference between a sequence of read-out signals from the two image sensors assigned to the setting sequence, a sequence of read-out signals integrated over said image points, and means in said evaluating circuit for forming a signal in correspondence to such read-out signals, which is characteristic of the delay set on the occurrence of the integrated read-out signal having the smallest amplitude, and which is representative of the range of the object.

2. An arrangement according to claim 1, wherein the output of said one image sensor is directly connected to the cooperable input of said evaluating circuit.

3. An arrangement according to claim 1, wherein the output of said one image sensor is connected to the cooperable input of said evaluating circuit over a constant delay element.

4. An arrangement according to claim 1, wherein said evaluating circuit includes a selection stage for determining the time of occurrence of the integrated read-out signal of the smallest amplitude within a setting sequence, and coding such time into an electrical value which corresponds to the time difference relative to the beginning of the setting sequence.

5. An arrangement according to claim 1, wherein the CTD image sensors each include a read-out device in the form of a charge transfer device.

6. A method of operating the arrangement as claimed in claim 1, wherein the adjustable delay element is subjected to repeated setting sequences.

7. An arrangement according to claim 1, wherein the evaluating circuit consists of a semiconductor circuit which, in particular, is monolithically integrated on a semiconductor substrate.

8. An arrangement according to claim 1, wherein said optical devices possess subsidiary pupillar openings of the objective, which define two different pupillar areas thereof, being provided with means for gating the groups of beams, which enter such pupillar areas, out of the beam path of the objective and projecting them onto an additional image plane.

9. An arrangement according to claim 1, wherein said delay element comprises a CTD arrangement, the stages of which are provided with respective outputs, and a switch-over device which connects such lastmentioned outputs in the sequence in which they are arranged consecutively to the output of the delay element.

10. An arrangement according to claim 9, wherein the switch-over device comprises a series of AND-gates, the first inputs of which form the inputs of the switch-over device and the outputs of which are connected in parallel with one another, and a shift register, the second inputs of such gates being connected to the individual outputs of said shift register, in which register an individual logic signal characterized by a relatively high voltage value can be shifted.

11. An arrangement according to claim 1, wherein the output of the evaluating device is connected to a measuring device visually displaying the range of the object from the arrangement.

12. An arrangement according to claim 11, wherein the measuring device is designed in such manner that the reaching of a given range by the object can be selectively determined.

13. An arrangement according to claim 11, wherein the measuring device comprises means for determining the interval of time between the points at which the object reaches two given ranges.

14. In an arrangement for measuring the range of an object, wherein two optical devices are provided which are offset relative to one another transverse to the direction of the object and which supply two images of such object, with a device being provided which analyzes the images, in the form of electrical signals, and by a comparison of the signals, forms a measured value which indicates the range, the combination of the analyzing device containing two CTD image sensors which are individually assigned to the auxiliary images, and whose aligned image points are arranged parallel to one another and in the direction of mutual displacement of the auxiliary images, the output of one CTD image sensor being connected to a first delay line having a plurality of mutually offset outputs, a series of differential amplifiers respectively having first inputs to which said outputs of said first delay line are connected, and respectively having second inputs operatively connected in common to the output of the other CTD image sensor, an evaluating circuit having respective inputs, each of the outputs of said amplifiers being connected to a corresponding one of said inputs of said evaluating circuit by a rectifier and a serially connected integrator, said evaluating circuit having means for determining the integrator having the smallest output signal and means for producing a signal which is characteristic of said smallest output signal and is representative of the range of the object.

15. An arrangement according to claim 14, wherein the CTD image sensors each include a read-out device in the form of a charge transfer device.

16. An arrangement according to claim 14, wherein said optical devices possess subsidiary pupillar openings of the objective, which define two different pupillar areas thereof, being provided with means for gating the groups of beams, which enter such pupillar areas, out of the beam path of the objective and projecting them onto an additional image plane.

17. A method of operating the arrangement as claimed in claim 14, wherein the switch-over device of the evaluating circuit is subjected to repeated switching sequences.

18. An arrangement according to claim 14, wherein the evaluating circuit consists of a semiconductor circuit which, in particular, is monolithically integrated on a semiconductor substrate.

19. An arrangement according to claim 14, wherein said evaluating circuit includes a selection stage and a switch-over device having inputs forming the inputs of said evaluating circuit and which connects each of its inputs individually and in accordance with a given time switching sequence to the input of said selection stage the latter comprising means for determining the time of the occurrence of the integrated output signal having the smallest amplitude within a switching sequence and coding this time into an electrical value which comprises the adjusting signal and which corresponds to the time difference relative to the beginning of the switching sequence.

20. An arrangement according to claim 19, wherein the switch-over device comprises a series of AND-gates, the first inputs of which form the inputs of the switch-over device and the outputs of which are connected in parallel with one another, and a shaft register, the second inputs of such gates being connected to the individual outputs of said shift register, in which register an individual logic signal characterized by a relatively high voltage value can be shifted.

21. An arrangement according to claim 19, wherein said selection stage comprises two scanning stages, a comparator, and a triggerable generator which supplies a rising or falling voltage curve, the signal input of the first scanning stage, the first input of the comparator forming a common input of the selection stage, the output of the first scanning stage being operatively connected to the second input of the comparator, with the comparator output being connected to the control inputs of the two scanning stages, the signal input of the second scanning stage being connected to the generator, and the output of the second scanning stage forming the output of the evaluation circuit.

22. An arrangement according to claim 14, wherein the output of the evaluating device is connected to a measuring device visually displaying the range of the object from the arrangement.

23. An arrangement according to claim 22, wherein the measuring device is designed in such manner that the reaching of a given range by the object can be selectively determined.

24. An arrangement according to claim 22, wherein the measuring device comprises means for determining the interval of time between the points at which the object reaches two given ranges.

* * * * *